July 13, 1965
J. C. HARIED
3,194,303
HEAT PUMP SYSTEM
Filed May 28, 1962
2 Sheets-Sheet 2
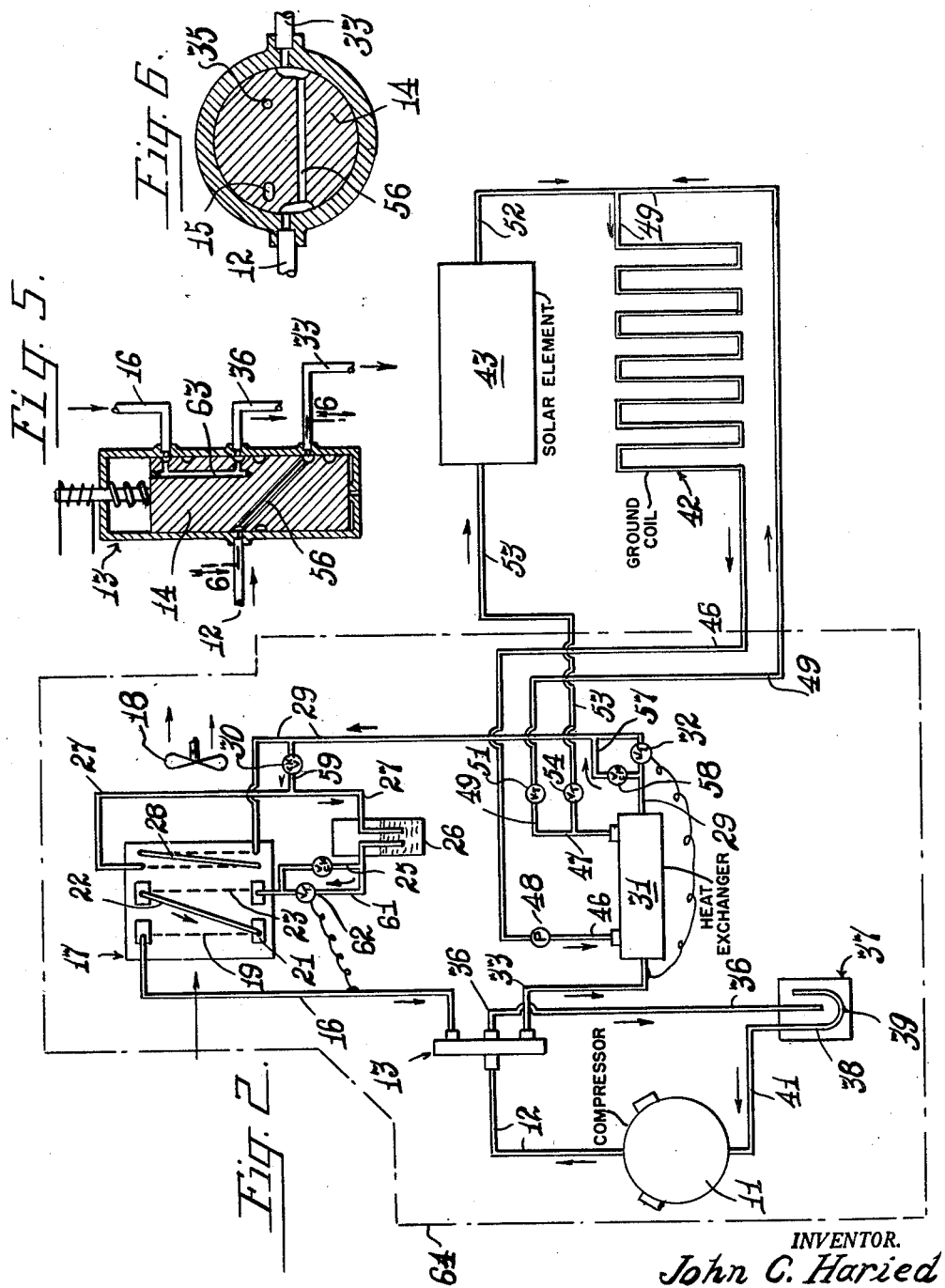
INVENTOR.
John C. Haried
BY
Charles H. Redman
Attorney

United States Patent Office 3,194,303
Patented July 13, 1965

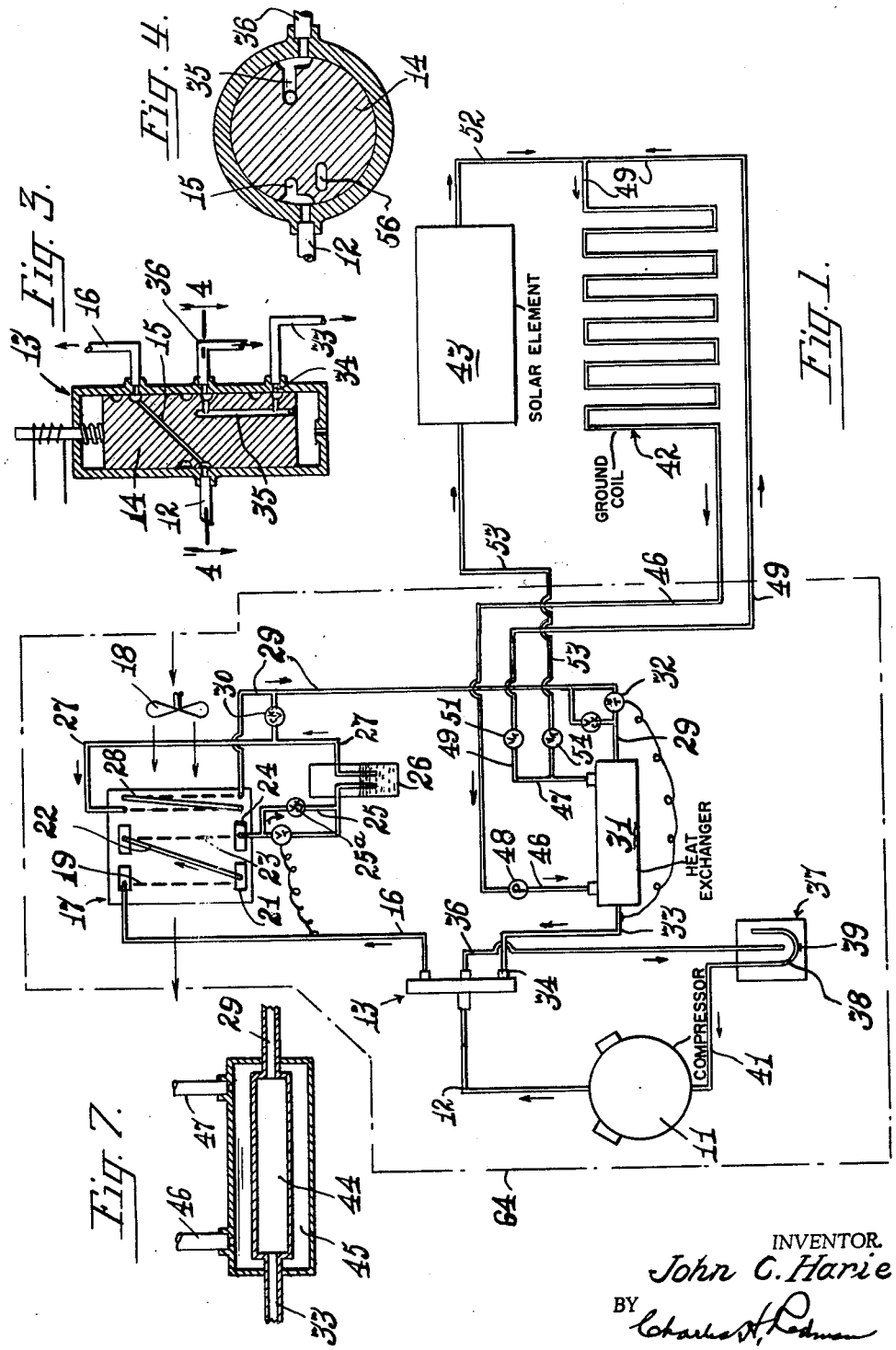

3,194,303
HEAT PUMP SYSTEM
John C. Haried, 1616 Kenilworth Place, Aurora, Ill.
Filed May 28, 1962, Ser. No. 198,313
4 Claims. (Cl. 165—29)

The present invention is an important improvement in closed heating and cooling distribution system. More particularly the invention relates to a novel heat pump system which utilizes the earth to store solar heat during the summer months for use in heating an inside space during the winter months. The system also functions for withdrawing excess heat from such inside space during summer months and discharging it either into the earth for storage or dissipating it in atmosphere. A further characteristic of the novel system is that usable heat may be made available for transfer between individual room units in an inside space.

More particularly the system includes a novel arrangement of heat source and heat distribution components so arranged as to obtain maximum efficiency at minimum cost, including in some installations the use of a natural water source, such as a well, for obtaining the required heat transfer while in other instances the earth itself. The heat pump system includes a refrigerant compressor-condenser system which has associated therewith a novel flow direction or reversing valve operable to control the direction of refrigerant flow so as to store collected heat from the atmosphere and from an inside space in a ground storage area or to carry heat from said area into an inside space to be heated by said heat. This heat transfer is effected at minimum cost and to a high degree of efficiency by operation of the heat pump which carries water from any source such as a deep well, or to and from a ground coil embedded in the earth, into and through a heat exchanger forming an integral part of the compressor-condenser system.

An example of the effectiveness and operation of the solar-ground heat transfer system herein disclosed may be substantially as follows with variations normal to variable conditions.

During the winter season a heat collector coil will extract heat generated by the sun from warm daytime air for delivery into air inside space. B.t.u.'s, in excess of the heating requirements of the inside space, are carried into a ground coil and are stored in the earth until the outside temperature falls below the temperature of the earth in the area of the ground coil. During the nighttime the solar heat collector coil is shut off, and heat stored during the daytime cycle in the earth is recaptured and transferred to the inside space for heating same.

During summer months, heat is removed by the system from the occupied or inside space and is rejected from the system into the ground coil where it is stored along with heat extracted from the sun by the heat collector coil. During this cycle of operation the temperature of the earth surrounding said ground coil rises from its normal 52° F. to approximately 100° F. by the end of summer. Thus, at the start of the heating season, there are millions of B.t.u.'s stored from the preceding summer sun and rejected inside space heat which B.t.u.'s are, when required, recaptured and conveyed into the inside space for heating same. The prestored B.t.u.'s plus the B.t.u.'s added during warm daytime in the winter season are sufficient to maintain the ground temperature sufficiently high to provide adequate inside space heating throughout the winter season.

In a system using a deep well instead of the ground coil, the heat is rejected into or extracted from the well water during the different cycles of operation.

It is therefore an object of the invention to provide a novel solar-earth heat transfer system.

Another object is to provide a novel heat exchange system.

Another object is to provide a novel heat means for extracting heat from the atmosphere and from an inside space to be cooled and storing said extracted heat in the earth for subsequent recapture and use in heating such inside space.

Another object is to provide a heat exchange system of the character referred to that operates with a minimum of moving parts, and is economical and efficient to use.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

FIG. 1 is a schematic view of the component parts of an exemplary heat pump system, illustrating the direction and path of refrigerant flow during a heating cycle;

FIG. 2 is a schematic view similar to FIG. 1, but showing the direction and path of refrigerant flow during a cooling cycle;

FIG. 3 is a detailed central sectional view of the refrigerant directional flow valve, as positioned during a heating cycle;

FIG. 4 is an enlarged transverse sectional view of the valve taken on line 4—4 of FIG. 3;

FIG. 5 is a detailed central sectional view of the refrigerant directional flow valve, as positioned during a cooling cycle;

FIG. 6 is an enlarged transverse sectional view of the valve taken on line 6—6 of FIG. 5; and, FIG. 7 is a sectional view of a representative form of heat exchanger.

Referring to the schematic illustrations of a representative installation of a solar-ground heat exchange system, and particularly to the exemplary representations shown in FIGS. 1 and 2, hot compressed refrigerant leaves a compressor 11 through a discharge line 12 and enters a four-way refrigerant flow reversing valve 13, which is described in detail hereinafter. This valve may be of a type known commercially as a 4WB Series Reversing Valve, manufactured by Alco Valve Co. Further description of the installation can best be related by specific reference to the heating cycle and then to the cooling cycle.

Heating Cycle

When the system is set to perform a heating cycle, as illustrated in FIG. 1, the refrigerant flow reversing valve 13 has its reciprocable valve body 14 (see FIGS. 3 and 4) located in the uppermost of its two positions so as to allow super-heated refrigerant entering through line 12 to flow through a valve passageway 15 in said body to an outlet port connected by line 16 to a combination evaporating-condensing unit or fluid temperature modifying device generally indicated at 17. The unit 17 acts as a refrigerant condenser and sub-cooler and has associated with it a suitable blower 18 for circulating air outside therethrough and around the coils thereof and into the inside space to be conditioned.

Specifically, the combination evaporating-condensing unit 17 includes a first section including a first coil 19 into the upper end of which enters refrigerant from line 16. As the refrigerant travels down through coil 19 much of its heat is absorbed and dispersed by the air passing out of the unit. As will be made apparent later, the air flowing over coil 19 has been pre-heated. The de-superheated refrigerant leaving coil 19 is collected in a bottom header 21 and is conveyed by line 22 to the upper header of a second coil 23 in unit 17. The air flowing over and around coil 23 will absorb sufficient heat from the de-superheated refrigerant flowing in said coil 23 to cause the refrigerant to change its state from a hot gas to a lower temperature liquid by the time it reaches the bottom header 24 of said coil.

The liquid or "wet" hot gas then passes from header 24 through a conduit 25 having a reverse flow check valve 25a therein and is discharged into a liquid refrigerant receiver 26. Because the refrigerant entering receiver 26 in a mixture of liquid and "wet" hot gas, both the discharge end of conduit 25 and the receiving end of an outlet line 27 leading from said receiver 26 are disposed with their open ends below the liquid level therein so that only pure liquid refrigerant is conducted back to the evaporating condenser unit 17 through a second section comprised of a coil or series of coils 28. Air entering the unit 17 initially encounters coil 28, and being lower in temperature than the liquid, the air will absorb heat from the liquid and leave the liquid in a sub-cooled state so its later action is more efficient.

It should be evident at this time that during a heating season air entering unit 17 is considerably cooler than the refrigerant in coil 28 and consequently the air stream absorbs any heat then retained by the refrigerant flowing through said coil and the temperature of said air is raised to a degree that is still considerably less than the temperature of the de-superheated gases in the coil 23 which it next encounters. Thus, heat is absorbed by said air stream from the de-superheated gases in coil 23 and is removed by said air stream which then passes around and over coil 19 through which the super-heated gas flows to absorb some of the heat therefrom.

Still referring to FIG. 1 of the drawings, the sub-cooled liquid refrigerant in coil 28 leaves said coil through a conduit 29 which carries it to a refrigerant fluid heat exchanger 31, an expansion valve 32 being provided in said conduit. This heat exchanger is best illustrated in FIG. 7 and its component elements will be desribed in detail presently. However, as the liquid refrigerant passes beyond expansion valve 32 it enters the low pressure side of the system and expands and, during its passage through the heat exchanger 31, it absorbs heat from the heat medium in the heat exchanger and returns to a gas state. The re-gasified refrigerant leaves the heat exchanger through conduit 33 and enters port 34 in reversing valve 13 which conducts said gas through a valve body passage 35 in register therewith (see FIG. 3) and into a suction line 36 leading from the valve to an accumulator 37.

As shown, the accumulator comprises a closed tank into which the gas enters freely. An outlet comprising a U-shaped conduit 38 in said tank has a minute orifice 39 in its lower curved end. One end of said conduit 38 is in direct communication with the interior of accumulator tank 37 to admit vapor thereinto and its other end is connected to an outlet conduit 41 leading back to compressor 11 where the cycle is repeated. The orifice 39 in said U-shaped conduit 38 permits a particular amount of refrigerant liquid and oil which may accumulate in tank 37 to enter conduit 38 and be vaporized by the pressure drop occurring in passing through this orifice.

In the present disclosure, the heat exchanger 31 has fluid flow connections with a ground storage coil 42 and with a solar element 43. The ground coil receives rejected heat from the inside space during the cooling season, as will be described presently, and also heat collected from the sun by the solar element during the cooling season as well as excess heat collected in the day-time during the heating season. It has been established by experimental installations that the ground coil 42 causes the temperature of the earth in the region surrounding same to raise from its normal of about 52° F. to about 100° F. by the end of the summer. This stored heat is drawn upon during the heating cycle to supply the requisite temperature for operating heat exchanger 31 when the system is functioning to deliver heat to an inside space.

The heat transfer between the heat exchanger and the solar and ground coils is controlled primarily through operation of temperature controlled valves in the connecting conduits. More particularly, ground and solar heat is delivered to the liquid refrigerant by the heat exchanger during space heating so as to revert the refrigerant to its original gaseous state.

Referring to FIGS. 1 and 7, the heat exchanger 31 may include an inner chamber 44 connected with conduits 29–33, and an outer chamber 45 having inlet and outlet conduits 46 and 47 respectively, in communication therewith. A pump 48 in conduit 46 operates to maintain a steady flow of liquid through conduit 46 from ground coil 42. The return conduit 47 also is connected to ground coil 42 through a conduit 49 having a temperature controlled solenoid valve 51 mounted therein.

The space coil or solar element 43 also is connected, as by a conduit 52 to the conduit 49 leading from the heat exchanger 31, whereas, a conduit 53 connects said solar element with the return conduit 47. The conduit 53 also has a temperature controlled solenoid valve 54 therein.

During a heating cycle, solenoid valve 51 is open whenever the air temperature is lower than the fluid temperature measured in line 47, whereas solenoid valve 54 is open only so long as the outdoor temperature is above the fluid temperature measured in line 47 so as to supplement the heat delivered to the heat exchanger through conduits 52, 49 and 46.

*Cooling cycle*

The same components and substantially the same system of conduits is used for space cooling. To accomplish this, the position of valve body 14 of flow reversing valve 13 is reversed to alter the direction of flow of the refrigerant liquid and gases through the conduits. The flow cycle is illustrated in FIGS. 2, 5 and 6. As therein disclosed, compressed refrigerant gas leaves compressor 11 through conduit 12 and passes into flow reversing valve 13 which now has its valve element 14 located in its lowermost position, as shown in FIG. 5. The super-heated refrigerant gas from conduit 12 now flows through a passageway 56 in the valve body and into conduit 33 leading to the refrigerant heat exchanger 31. Since this gas has a temperature far in excess of the ground temperature, the water or other cooling liquid flowing through the heat exchanger to and from the ground coil 42 absorbs heat from the refrigerant thus reverting it to its liquid state. The liquid refrigerant leaves the heat exchanger through conduit 29 but, in this instance, it by-passes expansion valve 32 and flows through a by-pass conduit 57 having a check valve 58 therein and is delivered to receiver 26 through a second by-pass conduit 59 connecting conduit 29 with conduit 27, and then out of said receiver through a conduit 61 that by-passes conduit 25. A check valve 30 in conduit 59 controls directional flow through said conduit. Conduit 61 is provided with an expansion valve 62 which allows the refrigerant to change from its liquid state to a low temperature gas. The refrigerant gas then successively flows through coils 23 and 19 of evaporating-condensing unit 17 where it absorbs heat from higher temperature air now flowing from the inside space to the atmosphere over said coils. The now low pressure refrigerant gas leaving coil 19 flows through conduit 16 back to refrigerant flow valve 13. With said valve in the position shown in FIG. 5, the gas passes through a passageway 63 in valve element 14 and enters conduit 36 which conducts it back to accumulator 37. From the accumulator, the gas re-enters compressor 11 and the flow cycle is repeated.

*General*

The heat pump system is readily converted for use in conjunction with a deep well, the water of which is used during both heating and cooling seasons. In such instance the solar unit and ground coil are omitted and the inlet and outlet conduits 46–47 leading to and from heat exchanger 31 are connected with the source of well water for effecting the requisite heat exchange with the refrigerant flowing through the system.

In all instances, the controls for the solenoid valves, blower, motor, compressor, and flow reversing valve may consist of conventional temperature responsive control units mounted in requisite positions for maximum efficiency and the heat pump system preferably is enclosed in a suitable cabinet, generally indicated in dot-dash lines 64 so as to provide a self-contained unit.

As many possible embodiments may be made in the invention, and as many changes might be made in the embodiments above set forth, it is to be understood that all matters hereinbefore set forth or shown in the accompanying drawings are to be interpreted as illustrative and not in a limiting sense.

What I claim and desire to secure by Letters Patent of the United States is:

1. A heating and cooling apparatus comprising a refrigerant compressor, a fluid temperature modifying device, means connected to said compressor for circulating a refrigerant therebetween, and means for passing a fluid whose temperature is to be modified through same in heat exchange relation therewith, said device comprising at least a first section and a second section, the latter of which is disposed upstream from said first section, the first section comprising a combined evaporator-condenser and said second section comprising liquid refrigerant sub-cooling means, a liquid refrigerant receiver connected intermediate said first and second sections and including means for separating any gas from the liquid refrigerant entering same, said means for circulating a refrigerant comprising a refrigerant fluid heat exchanger connected intermediate the sub-cooling section of said temperature modifying device and said compressor, and a refrigerant flow reversing valve connected intermediate the compressor and each of said first section of the modifying device and said refrigerant fluid heat exchanger.

2. The heating and cooling apparatus recited in claim 1, in which a solar unit and a ground coil are connected in heat exchange relation to the refrigerant fluid heat exchanger.

3. The heating and cooling apparatus recited in claim 1, in which a ground coil is connected in heat exchange relation to the refrigerant fluid heat exchanger.

4. In a heating and cooling apparatus comprising a refrigerant compressor, a fluid temperature modifying device, means connected to said compressor for circulating a refrigerant therebetween, and means for passing a fluid whose temperature is to be modified through said device in heat exchange relation therewith, said improvement comprising first and second sections in said fluid temperature modifying device, said first section comprising a combined evaporator-condenser and the second section being disposed upstream from said first section and comprising a liquid refrigerant sub-cooling means, a liquid refrigerant receiver connected intermediate said first and second sections and including means for separating any gas from the liquid refrigerant entering same, a refrigerant fluid heat exchanger being connected intermediate the sub-cooling section and said compressor, and a refrigerant flow reversing valve connected intermediate the compressor and each of said first section and said refrigerant fluid heat exchanger.

References Cited by the Examiner

UNITED STATES PATENTS

| | | | |
|---|---|---|---|
| 2,007,406 | 7/35 | Miller | 165—45 |
| 2,167,878 | 8/39 | Crawford | 165—45 X |
| 2,461,449 | 2/49 | Smith et al. | 165—45 X |
| 2,584,573 | 2/52 | Gay | 165—45 X |
| 2,693,939 | 11/54 | Marchant et al. | 165—45 X |
| 2,726,067 | 12/55 | Wetherbee et al. | 165—45 X |
| 2,749,724 | 6/56 | Borgerd et al. | 165—45 |

CHARLES SUKALO, *Primary Examiner.*

JAMES W. WESTHAVER, *Examiner.*